United States Patent
Kuttel et al.

(10) Patent No.: US 10,150,659 B2
(45) Date of Patent: Dec. 11, 2018

(54) DIRECT DRIVE DRAWWORKS WITH BEARINGLESS MOTOR

(71) Applicant: CANRIG DRILLING TECHNOLOGY LTD., Houston, TX (US)

(72) Inventors: Beat Kuttel, Spring, TX (US); Kevin R. Williams, Cypress, TX (US); Brian Ellis, Houston, TX (US); Faisal Yousef, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 651 days.

(21) Appl. No.: 14/815,622

(22) Filed: Jul. 31, 2015

(65) Prior Publication Data

US 2016/0031686 A1 Feb. 4, 2016

Related U.S. Application Data

(60) Provisional application No. 62/099,258, filed on Jan. 2, 2015, provisional application No. 62/032,880, filed on Aug. 4, 2014.

(51) Int. Cl.
*B66D 1/82* (2006.01)
*B66D 1/12* (2006.01)
(Continued)

(52) U.S. Cl.
CPC ............... *B66D 1/82* (2013.01); *B66D 1/12* (2013.01); *B66D 1/14* (2013.01); *F16F 15/02* (2013.01);
(Continued)

(58) Field of Classification Search
CPC .... B66D 1/82; B66D 1/12; B66D 1/14; F16F 15/02; F16M 7/00; F16M 1/04; H02K 5/24; H02K 5/26; H02K 7/14
See application file for complete search history.

(56) References Cited

U.S. PATENT DOCUMENTS

| | | | |
|---|---|---|---|
| 1,922,184 A * | 8/1933 | White | H02K 5/24 248/593 |
| 2,709,284 A | 5/1955 | Evans et al. | |

(Continued)

FOREIGN PATENT DOCUMENTS

| | | |
|---|---|---|
| CN | 200943027 Y | 9/2007 |
| CN | 201074171 Y | 6/2008 |

(Continued)

OTHER PUBLICATIONS

Office Action issued in U.S. Appl. No. 12/629,354 dated Dec. 19, 2011 (11 pages).
(Continued)

*Primary Examiner* — Michael E Gallion
(74) *Attorney, Agent, or Firm* — Adolph Locklar

(57) ABSTRACT

An electric motor for a direct drive drawworks may be supported by one or more motor mounts. The motor mounts may include adjusting assemblies adapted to increase or decrease the length of the motor mounts. The motor mounts may include damping assemblies adapted to allow damped motion between the electric motor and the surface. The length and damping coefficients of the motor mounts may be adjusted to align the electric motor with the drum or shaft to reduce vibration. The electric motor may be removable from the drawworks by, for example, a splined shaft, a flange coupled shaft, or the rotor being selectively removable from the interior of the motor.

23 Claims, 7 Drawing Sheets

(51) Int. Cl.
  *F16F 15/02* (2006.01)
  *H02K 5/24* (2006.01)
  *H02K 5/26* (2006.01)
  *H02K 7/14* (2006.01)
  *B66D 1/14* (2006.01)
  *F16M 7/00* (2006.01)
  *F16M 1/04* (2006.01)

(52) U.S. Cl.
  CPC ............... *F16M 7/00* (2013.01); *H02K 5/24* (2013.01); *H02K 5/26* (2013.01); *H02K 7/14* (2013.01); *F16M 1/04* (2013.01)

(56) References Cited

U.S. PATENT DOCUMENTS

| | | | |
|---|---|---|---|
| 3,231,803 A | 1/1966 | Pryor et al. | |
| 3,653,636 A | 4/1972 | Burrell | |
| 4,046,355 A | 9/1977 | Martin | |
| 4,226,311 A | 10/1980 | Johnson et al. | |
| 4,242,057 A | 12/1980 | Bender | |
| 4,284,253 A | 8/1981 | Uribe | |
| 4,314,692 A | 2/1982 | Brauer et al. | |
| 4,438,904 A | 3/1984 | White | |
| 4,527,959 A | 7/1985 | Whiteman | |
| 4,545,017 A | 10/1985 | Richardson | |
| 4,545,567 A | 10/1985 | Telford et al. | |
| 4,910,790 A | 3/1990 | Kerashaw | |
| 5,146,433 A | 9/1992 | Kosmala et al. | |
| 5,259,731 A | 11/1993 | Dhindsa et al. | |
| 5,306,124 A | 4/1994 | Back | |
| 5,331,238 A | 7/1994 | Johnsen | |
| 5,351,767 A | 10/1994 | Stogner et al. | |
| 5,375,098 A | 12/1994 | Malone et al. | |
| 5,511,929 A * | 4/1996 | Loftus .................. | B60P 1/5423 |
| | | | 212/180 |
| 5,616,009 A | 4/1997 | Birdwell | |
| 5,663,541 A * | 9/1997 | McGregor, II ........... | H01H 1/20 |
| | | | 200/17 R |
| 5,952,757 A * | 9/1999 | Boyd, Jr. ........... | B22D 19/0054 |
| | | | 310/156.81 |
| 6,029,951 A | 2/2000 | Guggari | |
| 6,094,024 A | 7/2000 | Westlake | |
| 6,182,945 B1 | 2/2001 | Dryer et al. | |
| 6,419,465 B1 | 7/2002 | Goettel et al. | |
| 6,577,483 B1 | 6/2003 | Steicher et al. | |
| 6,995,682 B1 * | 2/2006 | Chen ........................ | B66D 1/46 |
| | | | 340/12.22 |
| 7,462,138 B2 | 12/2008 | Shetty et al. | |
| 7,549,467 B2 | 6/2009 | McDonald et al. | |
| 7,633,248 B1 | 12/2009 | Williams | |
| 7,737,592 B2 | 6/2010 | Makino et al. | |
| 7,851,962 B1 | 12/2010 | Williams | |
| 7,883,450 B2 * | 2/2011 | Hidler .................... | A61H 3/008 |
| | | | 212/104 |
| 8,368,276 B2 | 2/2013 | Wolf et al. | |
| 2002/0121823 A1 | 9/2002 | Gauthier | |
| 2004/0251766 A1 | 12/2004 | Komentani et al. | |
| 2004/0256110 A1 | 12/2004 | York et al. | |
| 2005/0206266 A1 | 9/2005 | Hans | |
| 2006/0017339 A1 | 1/2006 | Chordia et al. | |
| 2006/0049712 A1 | 3/2006 | Zepp et al. | |
| 2006/0108881 A1 | 5/2006 | Hauger et al. | |
| 2006/0108890 A1 | 5/2006 | Hauger et al. | |
| 2006/0119197 A1 | 6/2006 | Puterbaugh et al. | |
| 2006/0133905 A1 | 6/2006 | Woodruff | |
| 2006/0175064 A1 | 8/2006 | Yuratich | |
| 2006/0181238 A1 | 8/2006 | Choi et al. | |
| 2007/0053780 A1 | 3/2007 | Ruffner et al. | |
| 2007/0114856 A1 | 5/2007 | Park | |
| 2007/0228862 A1 | 10/2007 | Welchko et al. | |
| 2007/0241627 A1 | 10/2007 | Kharsa | |
| 2007/0267222 A1 | 11/2007 | Howard, Jr. et al. | |
| 2008/0061645 A1 | 3/2008 | Yukitake | |
| 2008/0116432 A1 | 5/2008 | Folk et al. | |
| 2008/0181798 A1 | 7/2008 | Folk et al. | |
| 2008/0203734 A1 | 8/2008 | Grimes et al. | |
| 2008/0265813 A1 | 10/2008 | Eschleman et al. | |
| 2008/0267785 A1 * | 10/2008 | Cervenka .................. | F04B 9/02 |
| | | | 417/50 |
| 2009/0267440 A1 | 10/2009 | Komentani et al. | |
| 2011/0175043 A1 * | 7/2011 | Lehoczky ................ | B66D 1/12 |
| | | | 254/277 |
| 2011/0295269 A1 | 12/2011 | Swensgard et al. | |
| 2011/0309315 A1 | 12/2011 | Williams | |
| 2016/0031686 A1 * | 2/2016 | Kuttel ...................... | H02K 5/24 |
| | | | 166/66.4 |

FOREIGN PATENT DOCUMENTS

| | | |
|---|---|---|
| CN | 102667009 A | 9/2012 |
| WO | 8908941 A1 | 9/1989 |
| WO | 00/76054 A1 | 12/2000 |
| WO | 2005021927 A1 | 3/2005 |

OTHER PUBLICATIONS

Office Action issued in U.S. Appl. No. 12/629,354 dated Dec. 31, 2012 (11 pages).
Office Action issued in U.S. Appl. No. 12/629,354 dated Apr. 11, 2012 (11 pages).
Office Action issued in U.S. Appl. No. 12/876,673 dated Apr. 5, 2013 (12 pages).
Office Action issued in U.S. Appl. No. 12/876,673 dated Oct. 24, 2012 (14 pages).
Office Action issued in U.S. Appl. No. 12/643,439, dated Aug. 7, 2012 (21 pages).
Office Action issued in U.S. Appl. No. 12/643,439, dated Feb. 10, 2012 (20 pages).
Office Action issued in U.S. Appl. No. 13/126,319, dated Mar. 27, 2013 (5 pages).
Machine translation of WO8908941 publication date Sep. 21, 1989 (2 pages).
International Preliminary Report on Patentability and Written Opinion issued in International Patent Application No. PCT/US2010/060943, dated Jul. 5, 2012 (8 pages).
For the American Heritage Dictionary definition: connected. (n.d.) The American Heritage Dictionary of the English Language, Fourth Edition. (2003). Retrieved Apr. 29, 2013 from http://www.thefreedictionary.com/connected.
For the American Heritage Dictionary definition: receiving. (n.d.) The American Heritage Dictionary of the English Language, Fourth Edition. (2003). Retrieved Apr. 30, 2013 from http://www.thefreedictionary.com/receiving.
For the American Heritage Dictionary definition: directly. (n.d.) The American Heritage Dictionary of the English Language, Fourth Edition. (2003). Retrieved Apr. 29, 2013 from http://www.thefreedictionary.com/directly.
Office Action issued in Chinese Patent Application No. 201510470717.7, dated Jul. 2, 2018 and English translation thereof (14 pages).

* cited by examiner

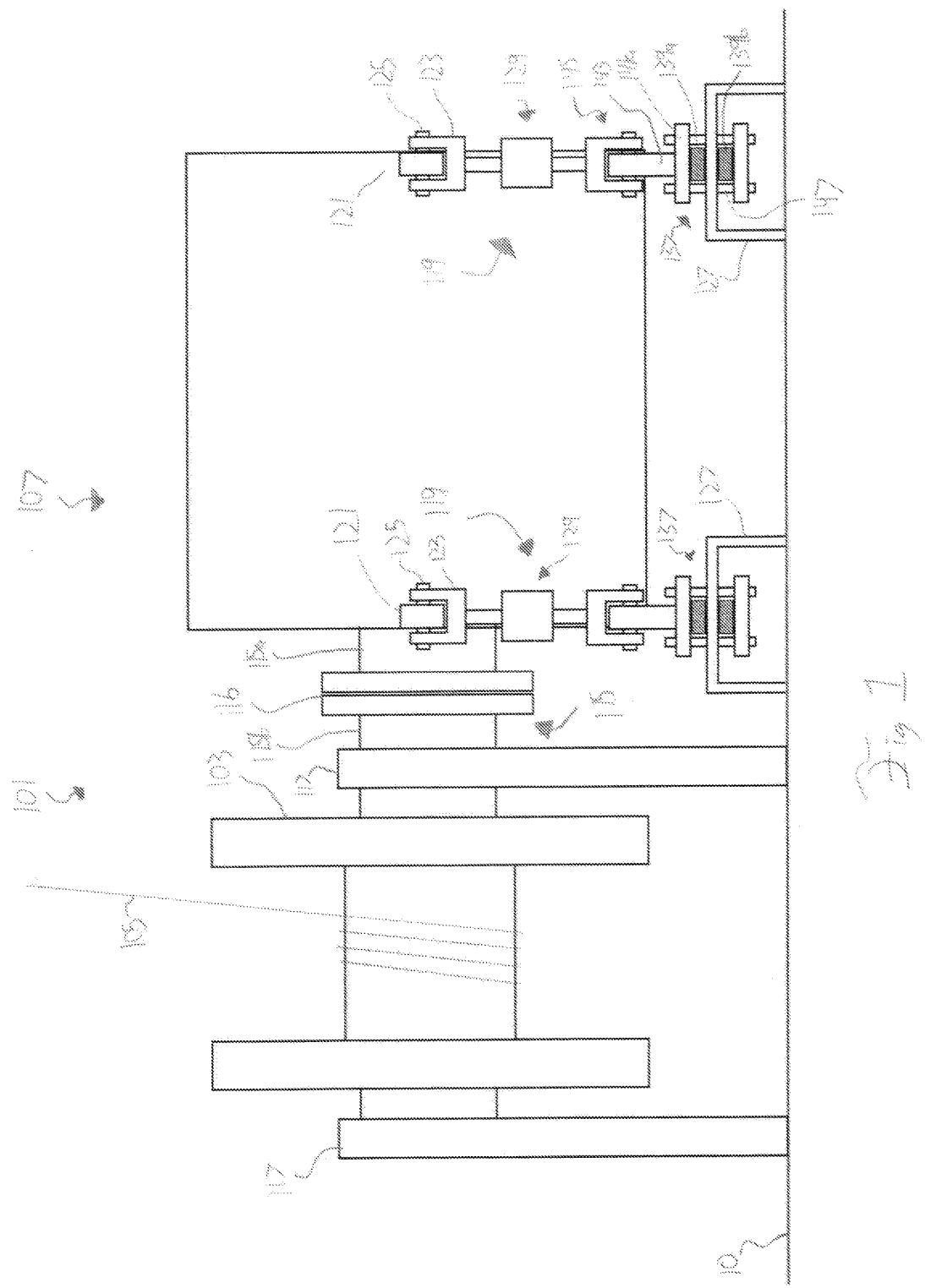

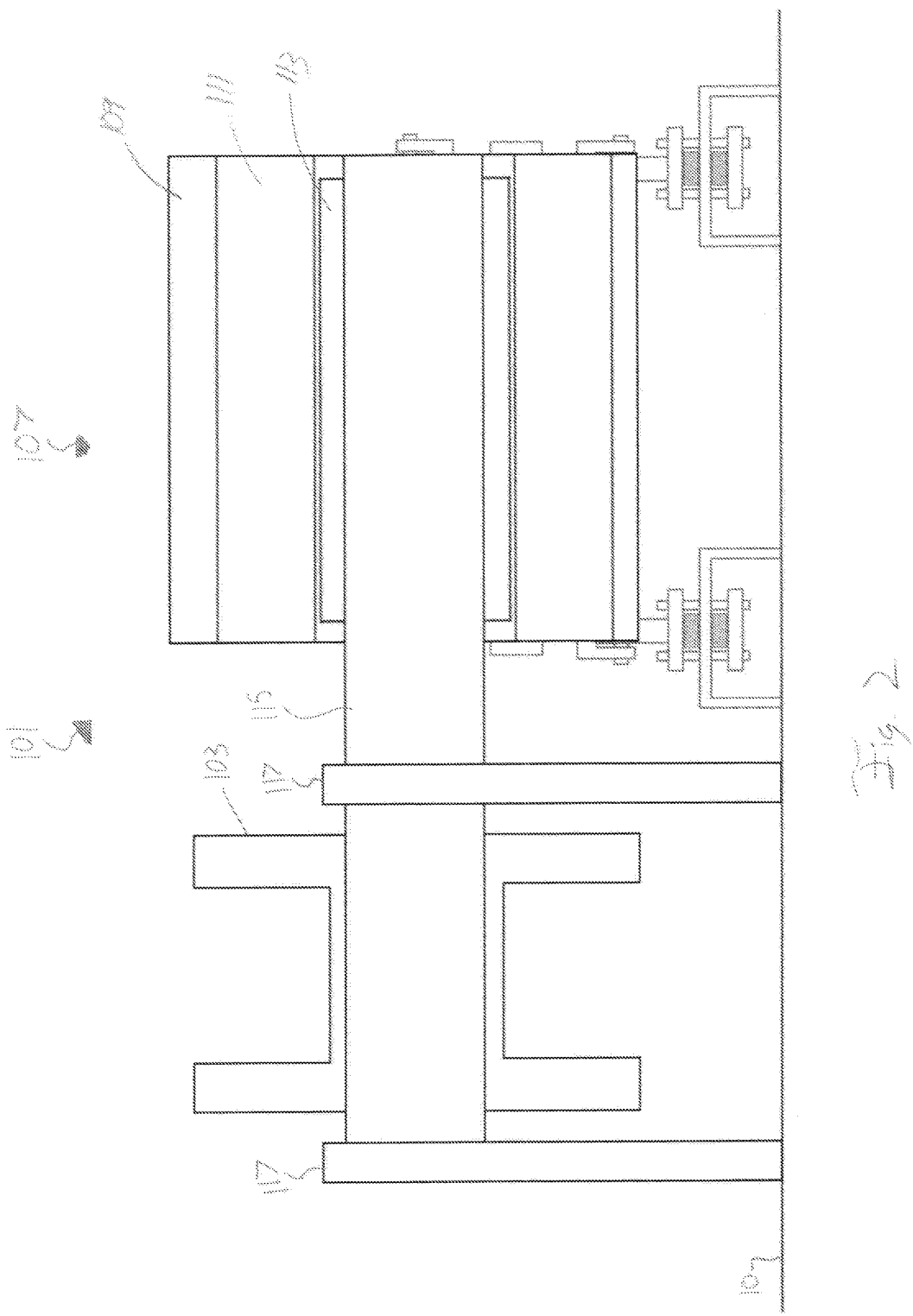

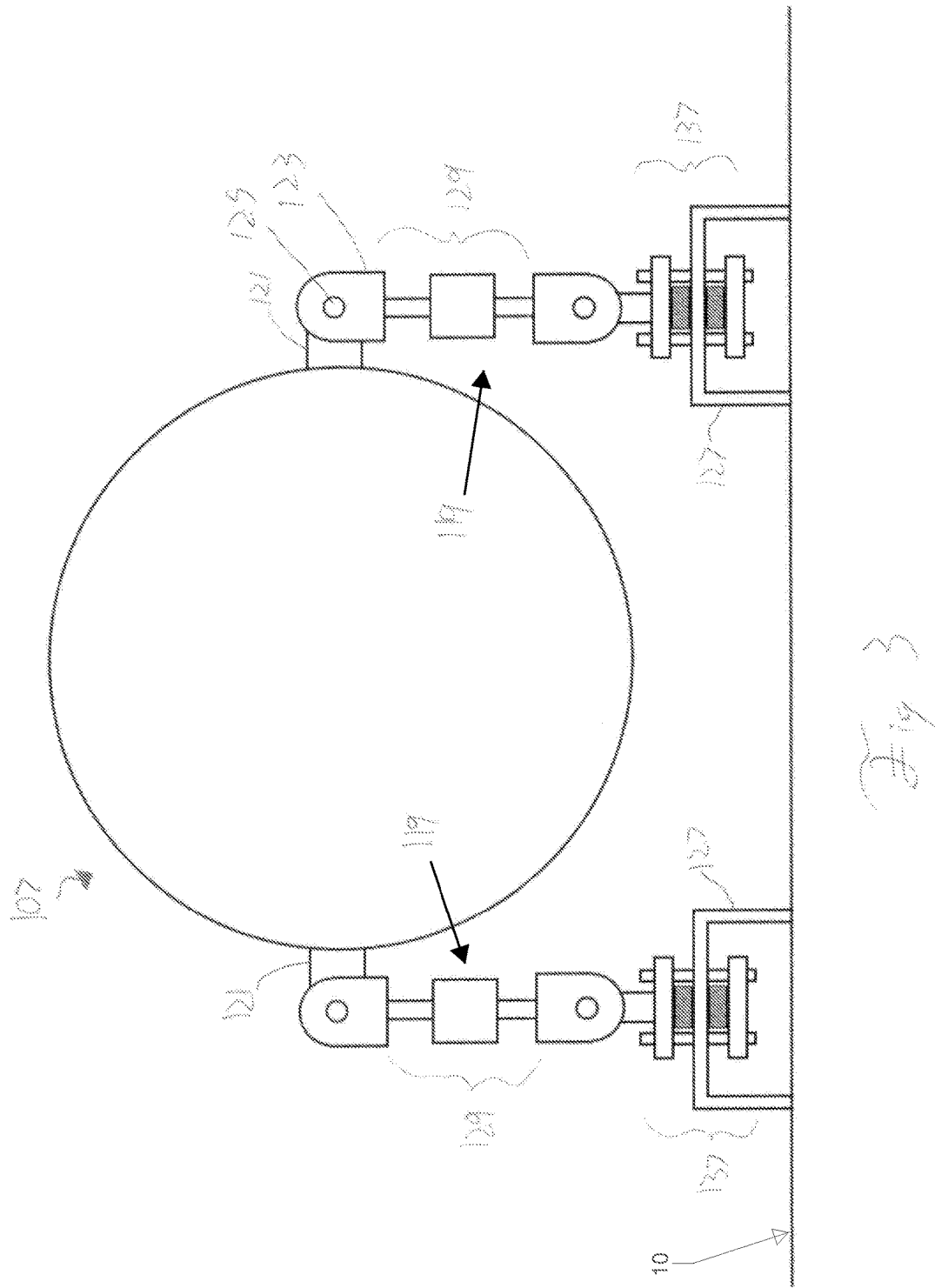

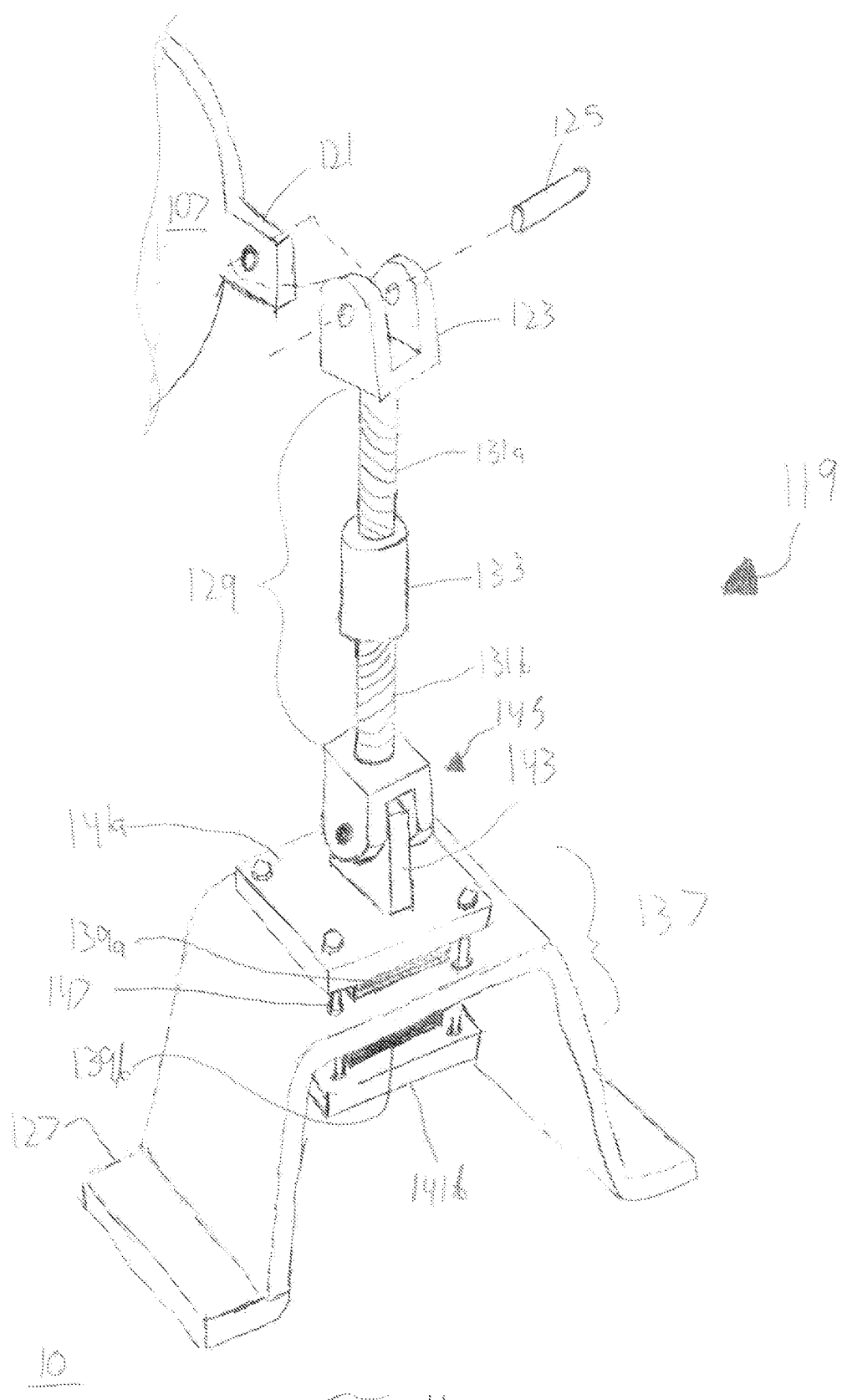

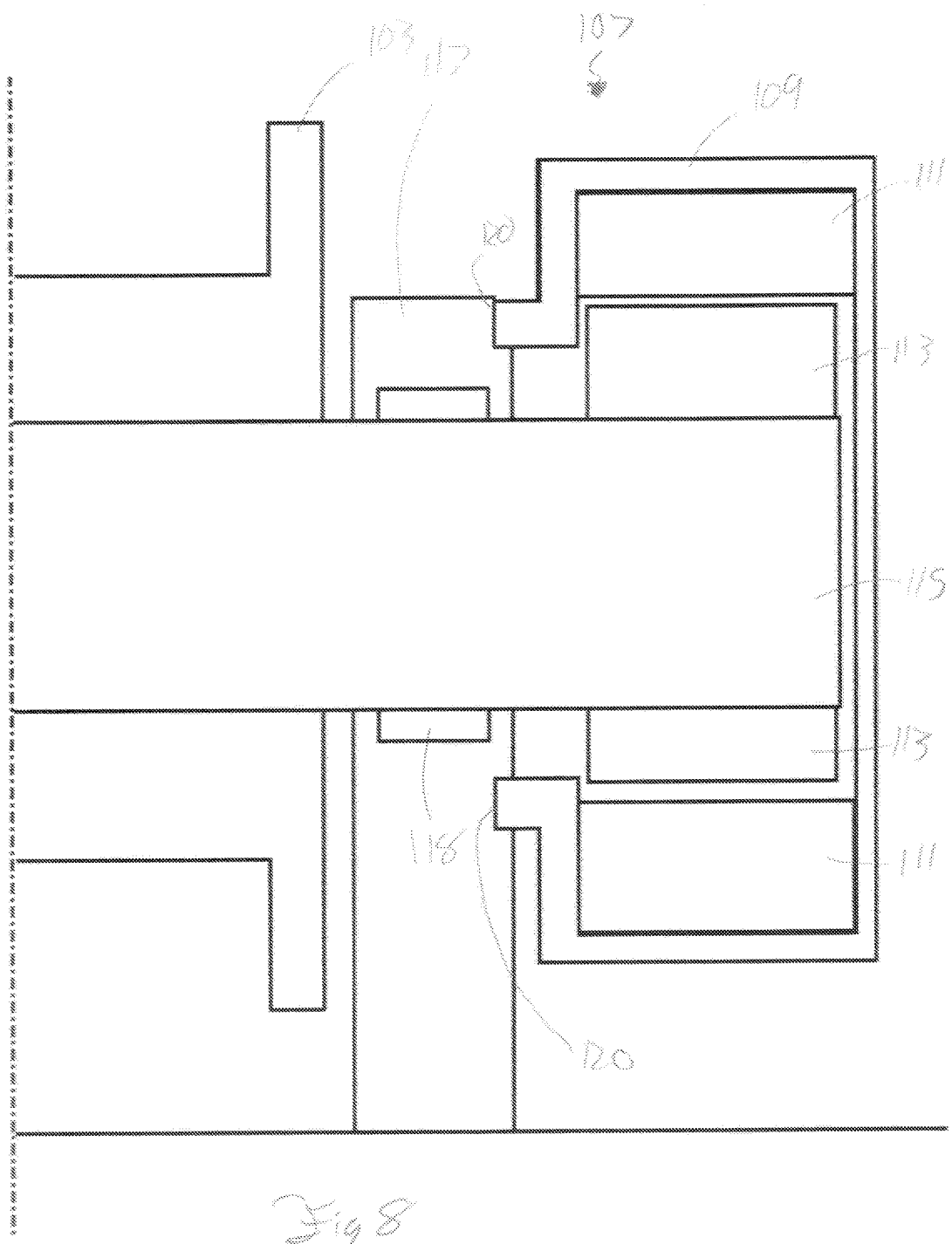

DIRECT DRIVE DRAWWORKS WITH BEARINGLESS MOTOR

CROSS-REFERENCE TO RELATED APPLICATIONS

This application is a non-provisional application which claims priority from U.S. provisional application No. 62/099,258, filed Jan. 2, 2015, and U.S. provisional application No. 62/032,880, filed Aug. 4, 2014, which are incorporated by reference herein in their entirety.

TECHNICAL FIELD/FIELD OF THE DISCLOSURE

The present disclosure relates generally to the mounting of electric motors, and specifically to motor mounts for drawworks, mining hoists, winches, or mud pumps.

BACKGROUND OF THE DISCLOSURE

In an apparatus driven by an electric motor, misalignment between rotating components thereof and the electric motor or stack-up of tolerance in bearing clearance may cause undesired results including vibration, noise, or damage to the motor or apparatus. Additionally, reaction moments caused by driving the shaft may cause undesirable vibration or unexpected internal interference within the motor. For example, electric motors may "cog" causing excessive noise and jerkiness if the stator undergoes undesirable rotational vibration.

As an example, a drawworks is a common piece of oil field equipment that is used in oil and gas drilling and production. A drawworks is positioned to lift and lower a travelling block in a drilling rig. The travelling block is suspended by a hoisting line, also known as a drill line, drilling line, or "drilline", from the derrick of the drilling rig, and is typically used to raise and lower drill string and casing out of and into a wellbore. The hoisting line is coupled to a drum which is rotated by the rotor. Typically, at least one motor is mounted on a surface, such as a skid, platform, or directly to the drill floor. Any misalignment between the rotor of the motor and the shaft of the drum or any bearing clearance may cause undesired vibration or damage to the drawworks. In order to account for any misalignment, the motor may be coupled with a flexible coupler to the drum. However, a flexible coupler may not be as strong as a solid shaft, and may serve to limit the maximum power capable of being used by the drawworks. Additionally, a flexible coupler will add length and complexity to the drawworks when compared to a stiff coupling. Fixedly mounting the motor to the surface may exacerbate any misalignment between the rotor and the shaft, as well as allow undesired rotational vibration of the stator. Any movement that is the result of a misalignment or bearing clearance may be suppressed by the fixed mounting to the surface, which may cause stresses in the shaft, bearing, and surface mounts, which may lead to premature fatigue and possibly failure.

SUMMARY

The present disclosure provides for a direct drive hoist. The hoist may include an electric motor. The hoist may also include a first motor mount. The first motor mount may be adapted to couple the electric motor to a surface. The first motor mount may include a damping assembly adapted to allow damped movement between the electric motor and the surface. The first motor mount may include an adjusting assembly adapted to extend or retract the first motor mount. The hoist may also include a shaft extending through the electric motor, the shaft adapted to be rotated by the electric motor. The hoist may also include a drum connected to the shaft, the drum adapted to be rotated by the shaft as the shaft is rotated by the electric motor.

The present disclosure also provides for a method. The method may include providing a direct drive hoist. The direct drive hoist may include an electric motor. The hoist may also include a first motor mount. The first motor mount may be adapted to couple the electric motor to a surface. The first motor mount may include a damping assembly adapted to allow damped movement between the electric motor and the surface. The first motor mount may include an adjusting assembly adapted to extend or retract the first motor mount. The hoist may also include a shaft extending through the electric motor, the shaft adapted to be rotated by the electric motor. The hoist may also include a drum connected to the shaft, the drum adapted to be rotated by the shaft as the shaft is rotated by the electric motor. The method may also include adjusting one or more of the damping assembly and the adjusting assembly in response to one or more of: radial displacement of the shaft; misalignment between the electric motor and the shaft, drum, or rotor; observed vibration; cogging; or bearing tolerances.

The present disclosure also provides for a method of assembling a direct drive hoist. The method may include providing a drum, the drum including a shaft, the drum coupled to a surface. The method may also include providing a stator corresponding to an electric motor, the stator coupled to a housing of the electric motor. The method may also include providing a rotor corresponding to the electric motor. The method may also include coupling the rotor to the shaft. The method may also include positioning the rotor cooperative with the stator. The method may also include coupling the housing to the surface with a first motor mount. The first motor mount may include a damping assembly adapted to allow damped movement between the electric motor housing and the surface. The first motor mount may include an adjusting assembly adapted to extend or retract the first motor mount. The method may also include adjusting the adjusting assembly to align the stator with the shaft.

The present disclosure also provides for a direct drive motor assembly. The direct drive motor assembly may include an electric motor. The electric motor may include a housing, a stator coupled to the housing, and a rotor. The direct drive motor assembly may further include a shaft extending through the electric motor. The shaft may be coupled to the rotor and adapted to be rotated by the electric motor. The direct drive motor assembly may also include a support adapted to rotatably couple the shaft and a surface. The support may include a bearing between the shaft and the support. The housing of the motor may be fixedly mounted to the support.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 5:
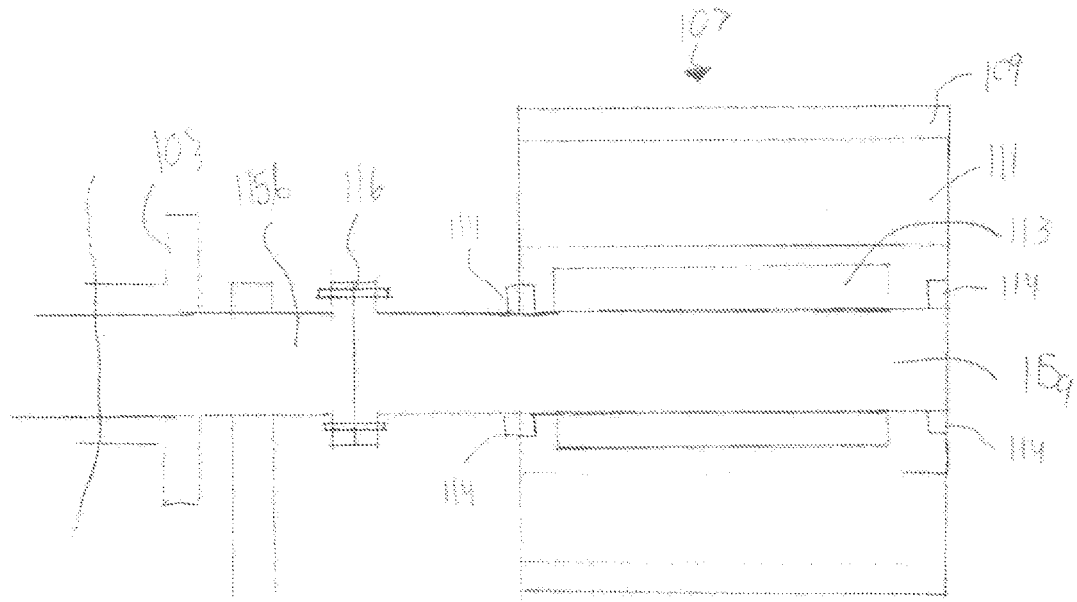
FIG. 5 depicts a partial cross section view of a drawworks consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
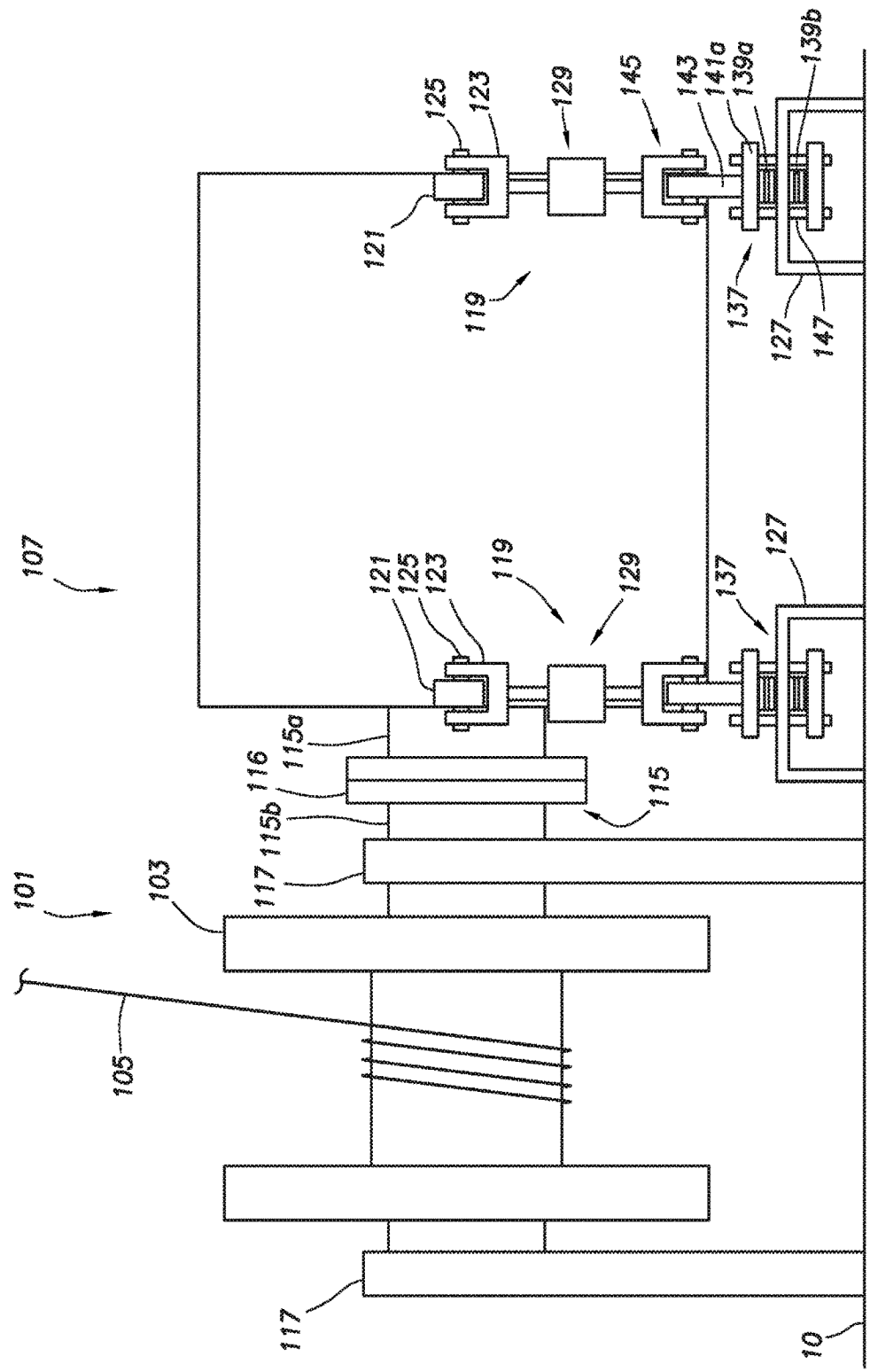
FIG. 1 depicts a side view of a drawworks consistent with embodiments of the present disclosure.
Figure 2:
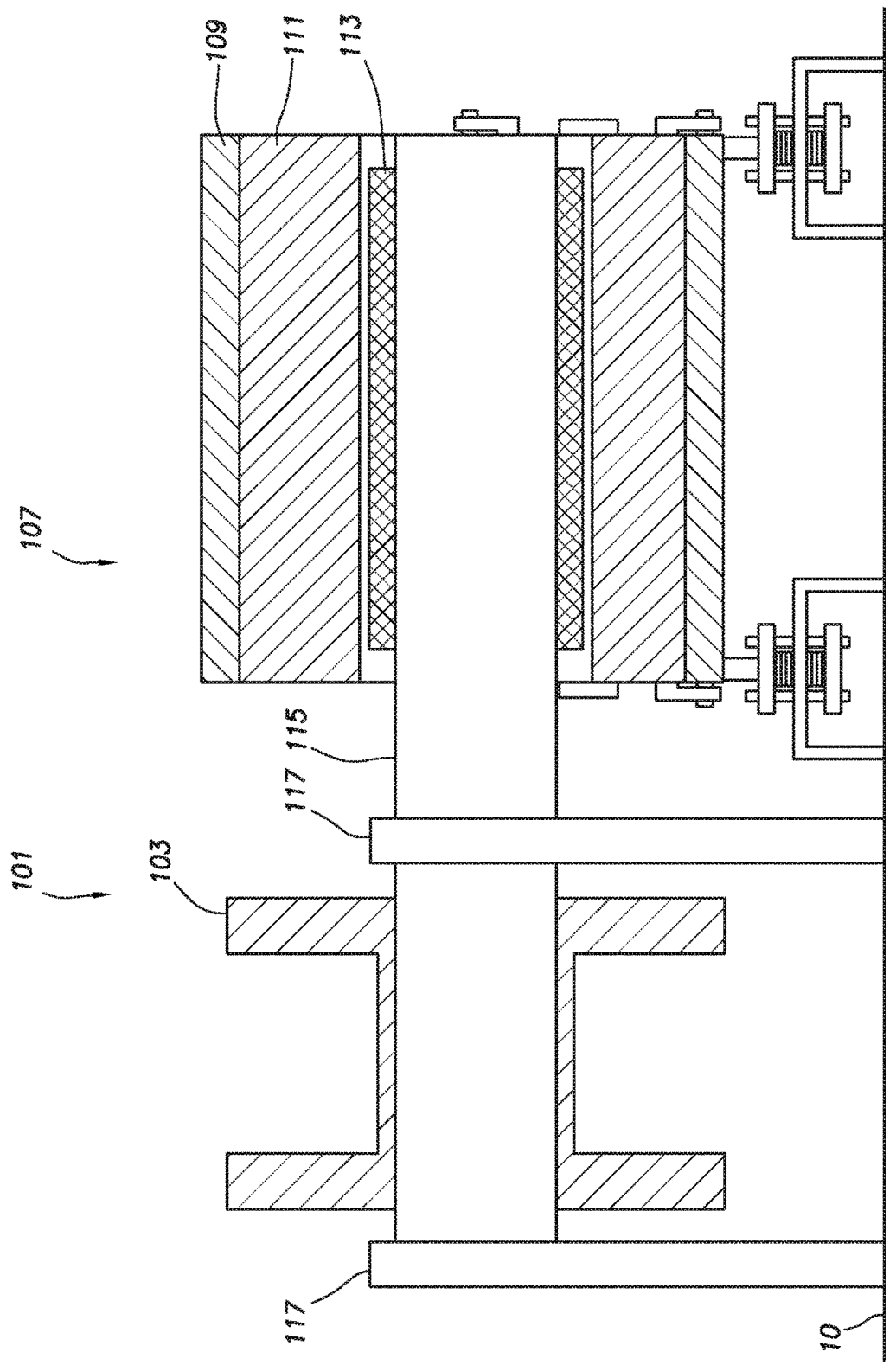
FIG. 2 depicts a cross section view of the drawworks of FIG. 1.

FIGS. 1, 2 depict drawworks 101 consistent with embodiments of the present disclosure. Drawworks 101 is positioned on surface 10. In some embodiments, surface 10 may be, for example and without limitation, the deck of a drilling rig for which drawworks 101 is being used. In other embodiments, surface 10 may be an undercarriage, frame, or skid upon which drawworks 101 is positioned.

Drawworks 101 may include drum 103. Drum 103 may be adapted to have hoisting line 105 wrapped therearound and, as drum 103 is rotated, heave in or pay out hoisting line 105 depending on the direction of rotation of drum 103.

In some embodiments, drawworks 101 may include one or more electric motors. In some embodiments as depicted in FIGS. 1, 2, a single electric motor 107 may be coupled to drum 103. In some embodiments, drawworks 101 may include one or more electric motors positioned on each end of drum 103. In some embodiments, electric motor 107 may include motor housing 109, stator 111, and rotor 113. As understood in the art with the benefit of this disclosure, rotor 113 and stator 111 may be located within motor housing 109.

In some embodiments, as depicted in FIG. 2, rotor 113 may be positioned within stator 111, a so-called interior rotor electric motor. Stator 111 may be fixed to the inner wall of motor housing 109. Stator 111 may extend around the cylindrical interior of motor housing 109. Stator 111 may include coils of wire positioned around the inner surface of stator 111. The coils of stator 111 are positioned to, when AC power is supplied thereto, induce a continuously rotating electromagnetic field into the interior thereof. In some embodiments, in which electric motor 107 is a permanent magnet motor, the electromagnetic field may interact with the permanent magnet field of permanent magnets included in rotor 113, thus rotating rotor 113. In some embodiments, in which electric motor 107 is an induction motor, the electromagnetic field may induce currents within one or more windings included in rotor 113, thus causing a reluctance and rotational force thereon.

In other embodiments, not shown, one having ordinary skill in the art with the benefit of this disclosure will understand that rotor 113 may be positioned outside of stator 111, a so-called exterior rotor electric motor. The coils may thus be positioned on an exterior surface of stator 111.

Rotor 113 may be coupled to shaft 115. In some embodiments, as depicted in FIG. 2, rotor 113 may be a generally tubular member, with shaft 115 extending at least partially into the interior thereof. In some embodiments, as depicted in FIG. 2, shaft 115 may couple both to rotor 113 and to drum 103. In other embodiments, as depicted in FIG. 1, motor shaft 115a may be coupled to rotor 113, and drum shaft 115b may be coupled to drum 103. Motor shaft 115a may be coupled to drum shaft 115b by a rigid coupler such as, for example and without limitation, flange coupler 116. Flange coupler 116 may, as understood in the art, be adapted to join motor shaft 115a and drum shaft 115b into a single, continuous shaft adapted to, as rotor 113 is rotated by electric motor 107, rotate drum 103.

In some embodiments, as depicted in FIGS. 1, 2, drawworks 101 may include one or more supports 117. Supports 117 may be positioned to couple between surface 10 and shaft 115. Supports 117 may, for example and without limitation, support the weight of one or more of drum 103, shaft 115, and electric motor 107. Supports 117 may also, for example and without limitation, transfer tension from hoisting line 105 to surface 10 when drawworks 101 is in operation and lifting a load. In some embodiments, supports 117 may be positioned near to drum 103 and electric motor 107 to, for example, minimize bending stresses on shaft 115. In some embodiments, supports 117 may couple to shaft 115 by, for example and without limitation, one or more bearings (not shown) adapted to allow shaft 115 to more easily rotate therein even when drawworks 101 is in operation and lifting a load.

Figure 3:
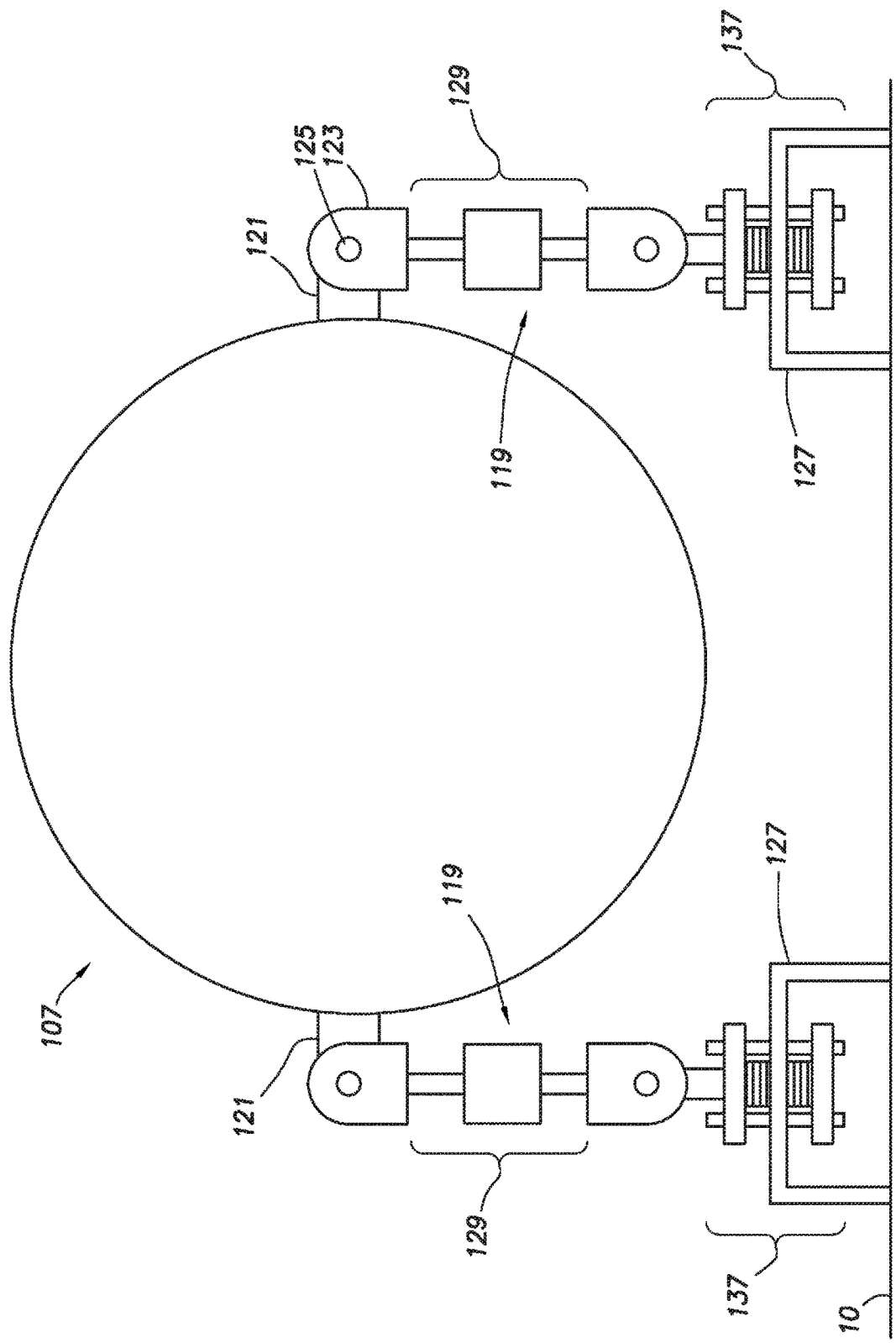
FIG. 3. depicts an end view of the drawworks of FIG. 1
Figure 4:
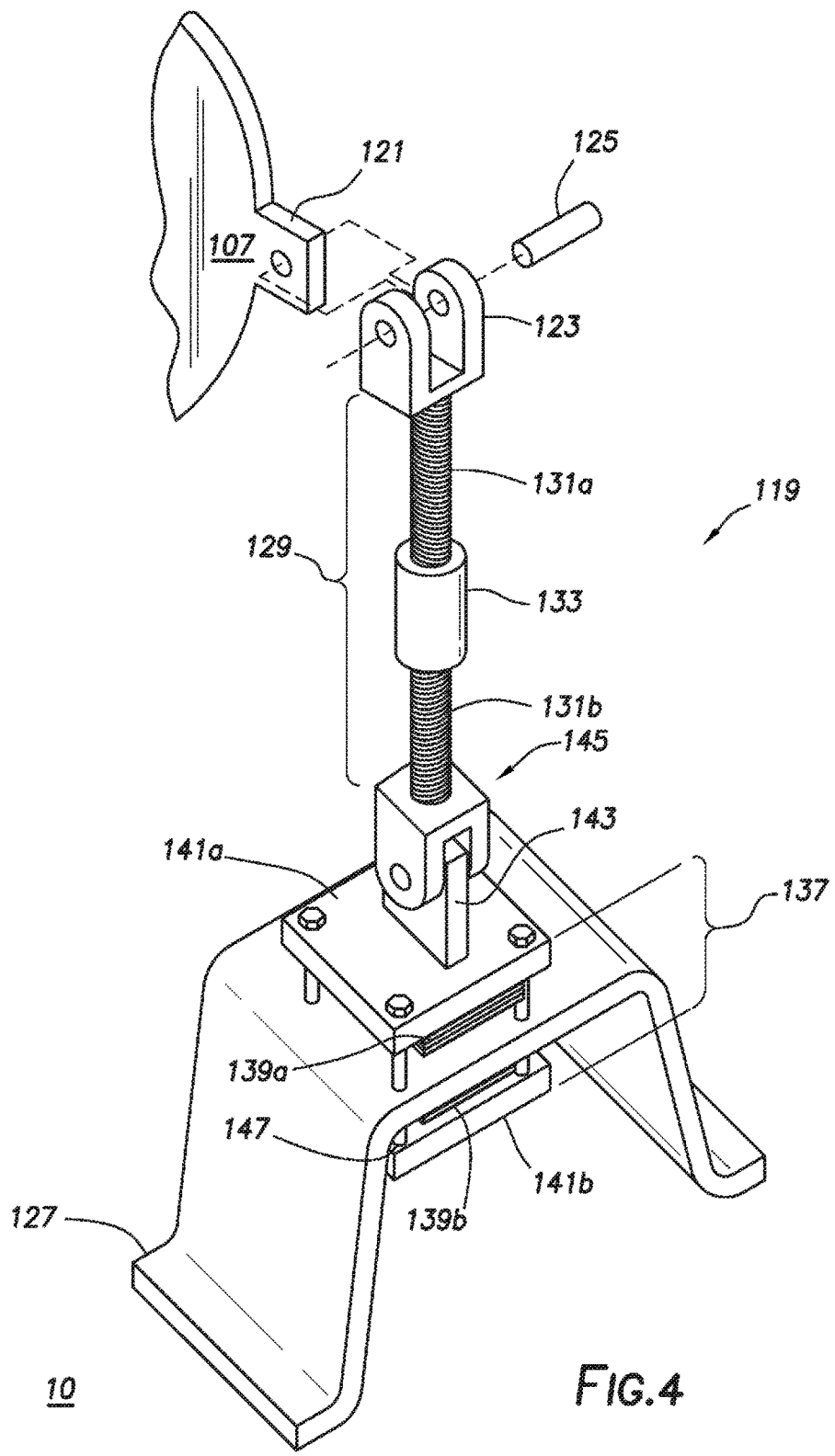
FIG. 4 depicts a perspective view of a motor mount consistent with embodiments of the present disclosure.
Figure 5:
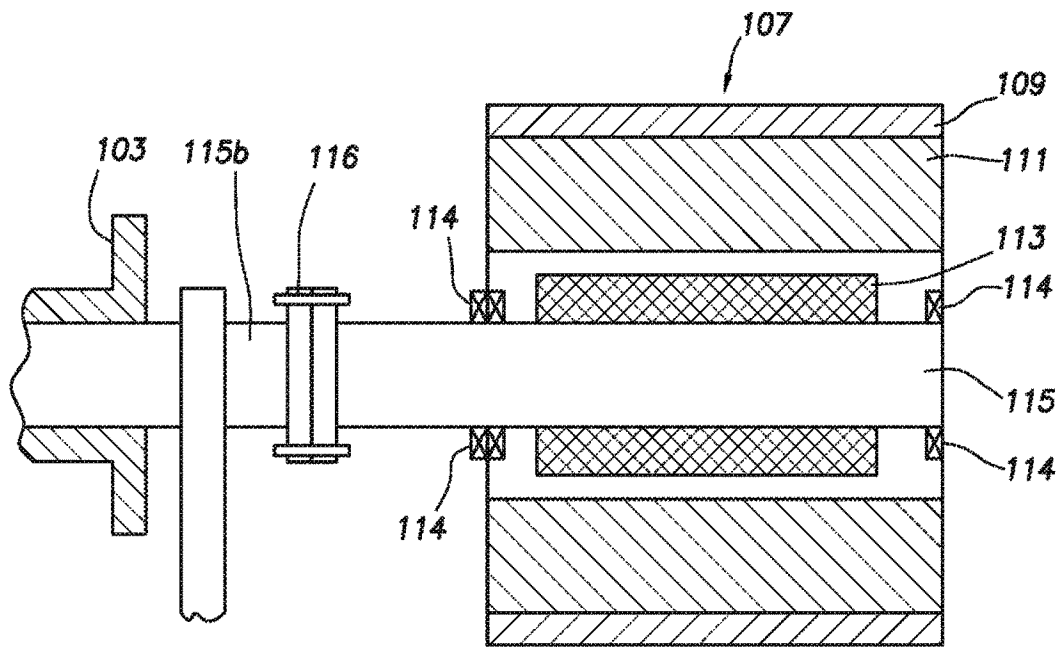
Figure 6:
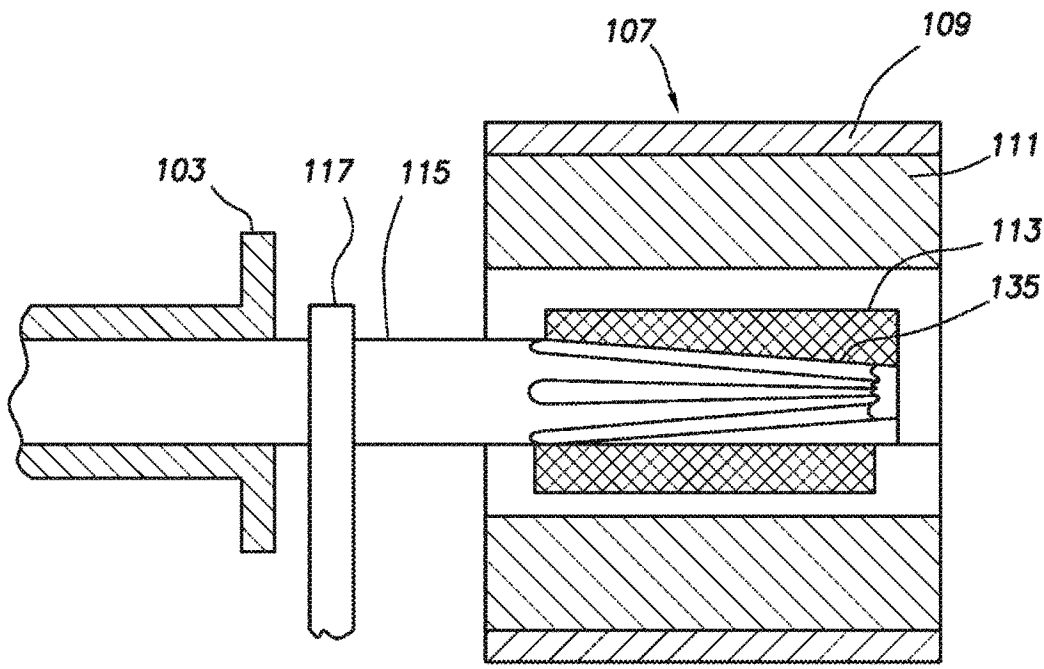
Figure 7:
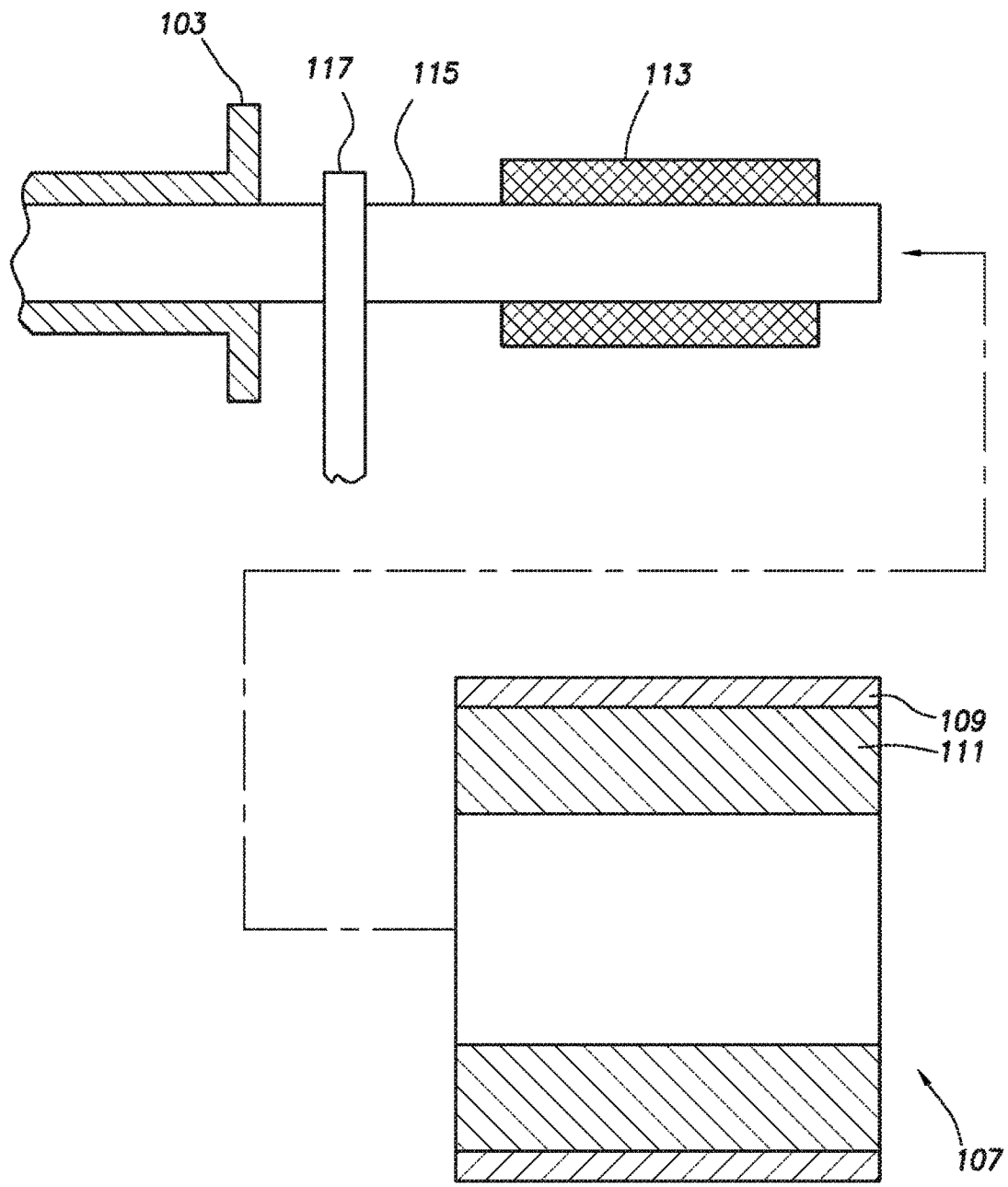

As depicted in FIGS. 1, 3, 4, electric motor 107 may be coupled to surface 10 by one or more motor mounts 119. Motor mounts 119 may be positioned to couple between motor housing 109 and surface 10. In some embodiments, motor housing 109 may include one or more support points 121 adapted to allow motor mounts 119 to couple to motor housing 109. In some embodiments, support points 121 may be coupled to an exterior surface of motor housing 109. In some embodiments, support points 121 may be formed as an integral portion of one or more subunits of motor housing 109. For example and without limitation, where motor housing 109 is formed having an end plate coupled to a cylindrical body, one or more support points 121 may be formed as a part of the end plate as an extension past the cylindrical body. In some embodiments, support points 121 may be generally flat extensions having a hole formed therein to allow for a rotating connection with motor mounts 119. In some embodiments, motor mounts 119 may include upper coupler 123 including a corresponding hole allowing pin 125 to couple upper coupler 123 to support point 121. In some embodiments, upper coupler 123 may, as depicted in FIGS. 1, 3, 4, include, for example and without limitation, a U bracket positioned to allow support point 121 to fit therein and be coupled thereto by pin 125. One having ordinary skill in the art with the benefit of this disclosure will understand that upper coupler 123 may couple to support point 121 by any coupler capable of providing at least one degree of freedom of movement, such as, for example and without limitation, a ball joint or U-joint.

In some embodiments, each motor mount 119 may be coupled to surface 10 by surface mount 127. In some embodiments, surface mount 127 may be coupled directly to surface 10.

In some embodiments, motor mounts 119 may be adapted to be selectively changeable in length to, for example and without limitation, increase or decrease the distance between surface mount 127 and its corresponding support point 121. In some embodiments, depicted in detail in FIG. 4, motor mounts 119 may include adjusting assembly 129. One having ordinary skill in the art with the benefit of this disclosure will understand that any mechanism capable of varying the length of motor mount 119 may be utilized as adjusting assembly 129. For example and without limitation, adjusting assembly 129 may include a hydraulic cylinder, screw jack, linear actuator, or rack and pinion.

In some embodiments, as depicted in FIG. 4, adjusting assembly 129 may be a Screwjack. Screwjack, as used herein, may also be a turnbuckle or other device for adjusting length. As depicted in FIG. 4, adjusting assembly 129 may include upper threaded rod 131a, lower threaded rod 131b, and body nut 133. Upper and lower threaded rods 131a, b may be threaded in opposite handedness, and body nut 133 may include corresponding threads to engage the threads of upper and lower threaded rods 131a, b. In such an embodiment, rotation of body nut 133 in one direction may cause threaded rods 131a, b to move closer together within body nut 133, effectively shortening motor mount 119. Rotation of body nut 133 in the opposite direction may correspondingly cause threaded rods 131a, b to move farther apart within body nut 133, effectively lengthening motor mount 119. One having ordinary skill in the art with the benefit of this disclosure will understand that although two threaded rods are described, one of the rods may instead be rotatably coupled to body nut 133 such that rotation of body nut 133 causes only the remaining threaded rod to extend or retract from body nut 133. Furthermore, one having ordinary skill in the art with the benefit of this disclosure will understand that any suitable mechanism including but not limited to the above mentioned length varying mechanisms may be substituted for the Screwjack previously described without deviating from the scope of this disclosure.

By adjusting the length of one or more motor mounts 119, the distance between surface 10 and support point 121, and thus the height of electric motor 107 may thus be adjusted. Adjustment of the height of electric motor 107, defined as the distance between electric motor 107 and surface 10, may allow electric motor 107 to be aligned with shaft 115. In some embodiments as depicted in FIGS. 1-3 in which multiple motor mounts 119 are used to support electric motor 107, selective independent adjustment of the length of each motor mount 119 may allow electric motor 107 to be varied in height and angle with respect to surface 10 to, for example, align electric motor 107 with shaft 115.

For example, in some embodiments, as depicted in FIGS. 1, 5, in which shaft 115 is made up of motor shaft 115a and drum shaft 115b coupled by a rigid coupling such as flange coupler 116, adjustment of the positioning of electric motor 107 may allow for alignment of motor shaft 115a and drum shaft 115b. In such an embodiment, electric motor 107 may be moved generally into position over surface 10 by, for example and without limitation, a crane. Electric motor 107 may be fully assembled, including motor housing 109, stator 111, rotor 113, and motor shaft 115a coupled to rotor 113. In some embodiments, electric motor 107 may further include one or more bearings 114 positioned to, for example and without limitation, prevent misalignment between motor shaft 115a, rotor 113, and stator 111. In some embodiments, electric motor 107 may be sealed, such that the interior of electric motor 107, including the space between stator 111 and rotor 113, is sealed from the surrounding environment.

In some embodiments, once electric motor 107 is moved generally into position over surface 10, motor mounts 119 may then be coupled between electric motor 107 and surface mounts 127. Motor mounts 119 may then be adjusted in length as previously discussed such that motor shaft 115a is in alignment with drum shaft 115b sufficiently within preselected tolerances.

In other embodiments, once electric motor 107 is moved generally into position over surface 10, motor shaft 115a and drum shaft 115b may be coupled by, for example and without limitation, flange coupler 116. Motor mounts may be coupled between electric motor 107 and surface mounts 127. Once external support of electric motor 107 is released, deflection in shaft 115 including deflection caused by misalignment between drum 103 and electric motor 107 may be measured. In some embodiments, the shaft deflection may be measured by, for example and without limitation, a dial indicator or a load cell. Motor mounts 119 may then be adjusted in length as previously discussed such that motor shaft 115 shows sufficiently little deflection caused by misalignment between drum 103 and electric motor 107, thus removing radial loading on shaft 115.

Figure 6:
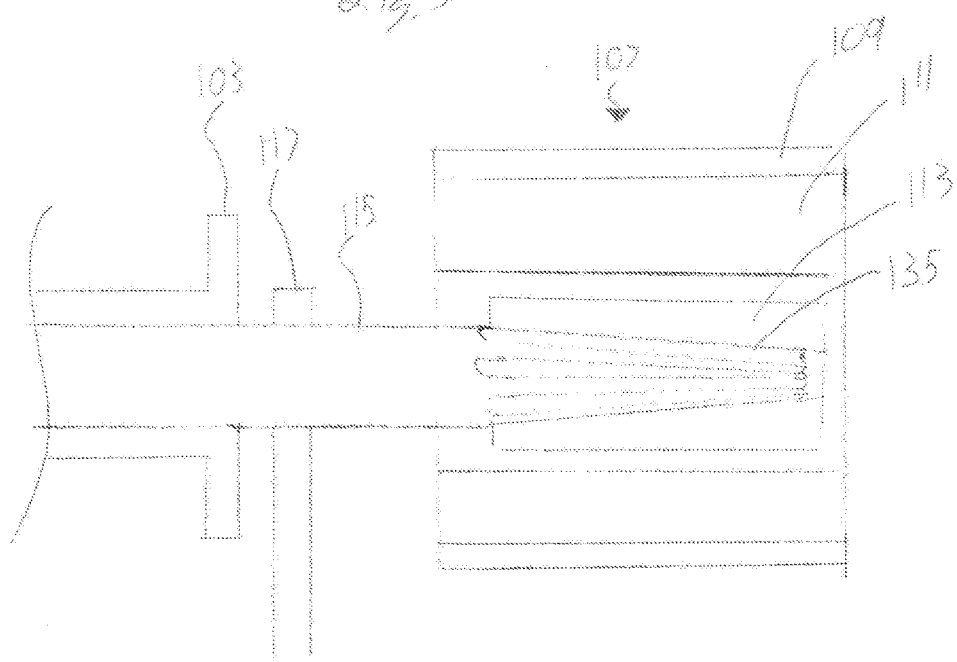
FIG. 6 depicts a partial cross section view of a drawworks consistent with embodiments of the present disclosure.
Figure 7:
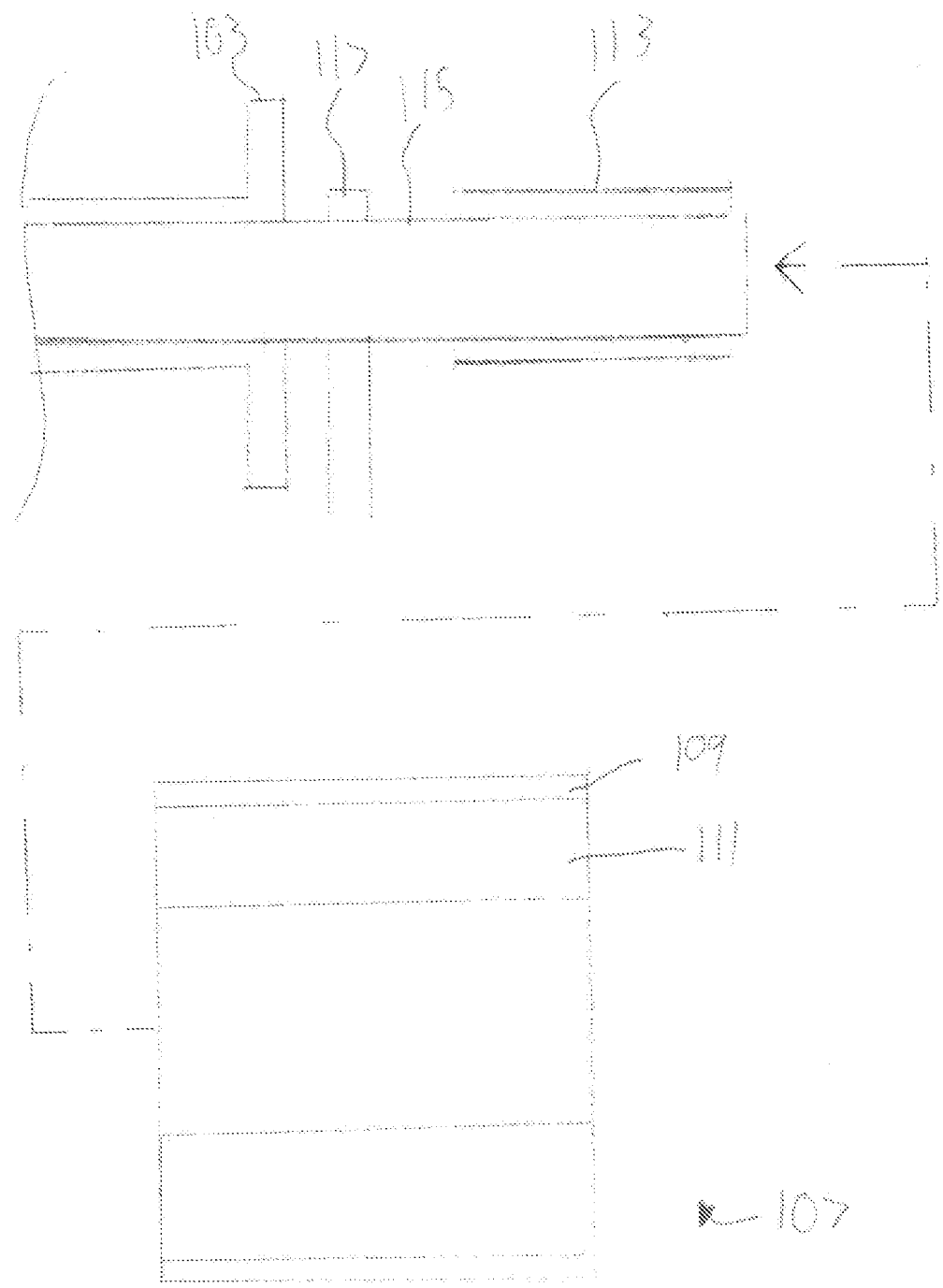
FIG. 7 depicts a partial cross section view of a drawworks consistent with embodiments of the present disclosure.

In some embodiments, as depicted in FIGS. 6, 7, shaft 115 may be formed as a single member coupled to drum 103. In some embodiments, shaft 115 and/or rotor 113 may include a coupling feature adapted to selectively couple shaft 115 to rotor 113. One having ordinary skill in the art with the benefit of this disclosure will understand that the coupling feature may include any feature on shaft 115 adapted to allow shaft 115 to couple to rotor 113 with sufficient rotational rigidity and may include, without limitation, mating splines, keyways, etc. In some embodiments, as depicted in FIG. 6, shaft 115 may include a splined portion 135 adapted to mesh with corresponding internal splines formed on the inner surface of rotor 113. In some embodiments, splined portion 135 may be inwardly tapered toward the end of shaft 115. Shaft 115 and rotor 113 may thus be coupled by sliding rotor 113 over the end of shaft 115.

In such an embodiment, as depicted in FIG. 6, shaft 115 may remain coupled to drum 103 and, in some embodiments, support 117. Electric motor 107, including rotor 113, stator 111, and motor housing 109 may be moved generally into position over surface 10. As electric motor 107 is moved into position, shaft 115 may be inserted into electric motor 107 such that splined portion 135 engages with the internal splines of rotor 113. Once fully inserted, in some embodiments, a compression plate (not shown) may be installed to couple shaft 115 to rotor 113. Motor mounts may be coupled between electric motor 107 and surface mounts 127. Once external support of electric motor 107 is released, deflection in shaft 115 including deflection caused by misalignment between shaft 115 and electric motor 107 may be measured. In some embodiments, the shaft deflection may be measured by, for example and without limitation, a dial indicator. Motor mounts 119 may then be adjusted in length as previously discussed such that motor shaft 115 shows sufficiently little deflection caused by misalignment between drum 103 and electric motor 107, thus removing radial loading on shaft 115. In some such embodiments, by removing axial loading on shaft 115, bearings between shaft 115 and electric motor 107 may be eliminated. In some embodiments, one or more lip seals (not shown) may be included on shaft 115 to, as previously discussed, seal the interior of electric motor 107 from the surrounding environment.

In some embodiments, as depicted in FIG. 7, rotor 113 may be formed as a part of shaft 115. In some embodiments, rotor 113 may be a separate, generally tubular member positioned about shaft 115. In other embodiments, the end of shaft 115 itself may form the rotor for electric motor 107.

For example, in an embodiment in which electric motor 107 is a permanent magnet motor, a plurality of permanent magnets may be directly affixed to shaft 115.

In such an embodiment, as depicted in FIG. 7, shaft 115 and rotor 113 may remain coupled to drum 103 and, in some embodiments, support 117. Electric motor 107, including stator 111 and motor housing 109 may be moved generally into position over surface 10. As electric motor 107 is moved into position, shaft 115 and rotor 113 may be inserted into electric motor 107 such that rotor 113 is properly positioned within stator 111 to allow normal operation of electric motor 107. Motor mounts 119 may be coupled between electric motor 107 and surface mounts 127. Once external support of electric motor 107 is released, deflection in shaft 115 including deflection caused by misalignment between rotor 113 and stator 111 may be measured. In some embodiments, the shaft deflection may be measured by, for example and without limitation, a dial indicator. Motor mounts 119 may then be adjusted in length as previously discussed such that motor shaft 115 shows sufficiently little deflection caused by misalignment between drum 103 and electric motor 107, thus removing radial loading on shaft 115. In some embodiments, motor mounts 119 may be adjusted in length as previously discussed such that rotor 113 is properly positioned within stator 111. In some such embodiments, by removing axial loading on shaft 115, bearings between shaft 115 and electric motor 107 may be eliminated. In some embodiments, one or more lip seals (not shown) may be included on shaft 115 to, as previously discussed, seal the interior of electric motor 107 from the surrounding environment.

In some embodiments of the present disclosure, the weight of electric motor 107 may be supported by shaft 115. In order to prevent rotation of electric motor 107 caused by a torque or moment caused by the operation of electric motor 107, electric motor 107 may be coupled to surface 10 by, for example and without limitation, chains or cables.

In some embodiments, motor mounts 119 may resist a torque or moment resulting from operation of electric motor 107. As understood in the art, during normal operation of electric motor 107, any change to angular momentum of a rotating component of drawworks 101 by electric motor 107, e.g. shaft 115, drum 103, and rotor 113, may cause an equal and opposite reactive angular momentum change or reactive moment on stator 111 and motor housing 109. Motor mounts 119 may thus be positioned to resist rotation of motor housing 109 through axial tensile or compressive loading. In some embodiments, motor mounts 119 may be positioned to be coupled on diametrically opposite points of motor housing 109 as depicted in FIG. 2. In some embodiments, surface mounts 127 may be positioned such that when installed, motor mounts 119 are oriented tangentially to the moment arm (extending from the centerline of shaft 115 to support points 121) to, for example, minimize the axial force on motor mounts 119 for a given reactive moment. Thus, in some embodiments, motor mounts 119 may be coupled to motor housing 109 on either ends of a horizontal diametrical line passing through the center of shaft 115.

In some embodiments, each of one or more motor mounts 119 may further include dampening assembly 137. As understood in the art, damping assembly 137 may serve to allow for a selected amount of variation in the length of motor mounts 119 in response to axial loading thereon. In some embodiments, damping assembly 137 may include any mechanism suitable for allowing variation in length of motor mount 119 in response to the axial loading thereon, and may include, for example and without limitations, one or more of springs, dashpots, elastomeric pads, shock absorbers, etc. In some embodiments, damping assembly 137 may include one or more damper elements positioned between weight-bearing plates. As depicted in FIGS. 1-4, damping assembly 137 may include upper damper element 139a. Upper damper element 139a may be positioned between surface mount 127 and upper bearing plate 141a. Upper bearing plate 141a may be included as part of motor mount 119, and positioned at a lower end thereof. In some embodiments, upper bearing plate 141a may include bearing mount 143 coupled, for example by bearing joint 145, to the remainder of motor mount 119.

In some embodiments, upper damper element 139a may be positioned such that movement of motor mount 119 is damped by upper damper element 139a. Upper damper element 139a may be formed from a material selected to have a sufficient resilience to compression to effectively dampen anticipated loading thereupon during operation of drawworks 101 while allowing for desired freedom of motion of electric motor 107.

In some embodiments, upper bearing plate 141a may be slidingly coupled to surface mount 127 to allow, for example, relative movement between upper bearing plate 141a and surface mount 127 in the axial direction, but to prevent motor mount 119 from separating from surface mount 127.

In some embodiments, damping assembly 137 may further include lower damper element 139b. Lower damper element 139b may be positioned between surface mount 127 and lower bearing plate 141b. Lower bearing plate 141b may be coupled to upper bearing plate 141a by, for example and without limitation, one or more threaded fasteners 147. Threaded fasteners 147 may be adapted to couple between upper bearing plate 141a and lower bearing plate 141b. In some embodiments, threaded fasteners 147 may be adapted to provide compressive loading between upper and lower bearing plates 141a, b. This compressive loading may serve to pre-stress upper and lower damper elements 139a, b, which may, for example and without limitation, allow for damped motion in both the upward and downward direction. In some embodiments, threaded fasteners 147 may pass through one or more corresponding holes formed in surface mount 127. In some embodiments, threaded fasteners 147 may be smooth at locations which are anticipated to move through the holes formed in surface mount 127.

In some embodiments, by tightening or loosening threaded fasteners 147, the pre-stressing of upper and lower damper elements 139a, b, may be adjusted, allowing for an adjustment in, for example and without limitation, freedom of motion and damping of electric motor 107. Upper and lower damper elements 139a, b may be formed from a material selected to have a sufficient resilience to compression to effectively dampen anticipated loading thereupon during operation of drawworks 101 while allowing for desired freedom of motion of electric motor 107. Furthermore, upper and lower damper elements 139a, b, may be formed from a material selected to have a desired range of resilience to compression in response to adjustments in pre-stressing.

Although described as being single damper elements, one having ordinary skill in the art with the benefit of this disclosure will understand that in some embodiments, upper and lower damper elements 139a, b, may instead be one or more damper elements or elements of different characteristics depending on desired properties. For example, one having ordinary skill in the art with the benefit of this disclosure will understand that one or more of upper and lower damper elements 139a, b, may be replaced by, for example and without limitation, one or more springs, dashpots, shock absorbers, rubber pads, or combinations thereof without deviating from the scope of this disclosure.

In some embodiments, upper and lower damper elements 139a, b may be replaced without removing motor mount 119. For example, in some embodiments, threaded fasteners 147 may be released, allowing lower bearing plate 141b to move sufficiently away from surface mount 127 to allow lower damper element 139b to be removed or replaced. In some embodiments in which motor mount 119 includes adjusting assembly 129, adjusting assembly 129 may be used to shorten the length of motor mount 119 while threaded fasteners 147 are slackened, allowing upper bearing plate 141a to move sufficiently away from surface mount 127 to allow upper damper element 139a to be removed or replaced.

Damping assembly 137 may allow for relative movement between electric motor 107 and surface 10. In some embodiments, the relative movement may allow electric motor 107 to move in response to any misalignment between electric motor 107 and shaft 115. Additionally, in embodiments including supports 117 (see FIG. 1), the relative movement may allow electric motor 107 to, for example and without limitation, move in response to any misalignment between electric motor 107 and supports 117 or any clearance tolerances from any bearings. Furthermore, the relative movement may allow electric motor 107 to move in response to any "shock spikes" caused by sudden changes in speed or load or cogging encountered during operation of electric motor 107.

As understood in the art with benefit of this disclosure, damping assembly 137 may be modeled as a spring-damper assembly. The spring coefficient k and damping coefficient B of damping assembly 137 may be selected such that electric motor 107 may move or "float" relative to surface 10 to account for any misalignment between shaft 115 and electric motor 107. In some embodiments, k and B may be selected such that electric motor 107 may move with minimal resistance with respect to anticipated misalignment tolerances between electric motor 107 and shaft 115. For example, in embodiments as discussed above utilizing upper and lower damper elements 139a, b, varying the pre-stressing thereon, the damping response of upper and lower damper elements 139a, b, i.e. the k and B values thereof, the harmonic frequency of electric motor 107 may be adjusted.

In some embodiments, k and B may be selected with respect to the mass of electric motor 107. In some embodiments, k and B may be selected with respect to a measured misalignment between electric motor 107 and drum 103, shaft 115, or support 117. In some embodiments, k and B may be selected such that the harmonic frequency of the spring-mass-damper system created by damping assembly 137 and electric motor 107 does not correspond to an anticipated rotation rate of drum 103. By selecting a harmonic frequency not corresponding to an anticipated rotation rate of drum 103, harmonic oscillation may be minimized. In some embodiments, the harmonic frequency may be selected to be less than an anticipated rotation rate of drum 103. By selecting a harmonic frequency less than an anticipated rotation rate of drum 103, higher order harmonic oscillations may serve to counterbalance any first-order harmonic oscillation of the drum. In some embodiments, the harmonic frequency may be selected to be less than ½ of the anticipated rotation rate of drum 103. In some embodiments, the harmonic frequency may be selected to be less than ⅓ of the anticipated rotation rate of drum 103.

In some embodiments of the present disclosure, one or more of deflection, vibration, or loads of electric motor 107 or motor mounts 109 may be monitored. In some embodiments, one or more load cells may be positioned on drawworks 101. For example, a load cell may be placed at one or more of surface mounts 127 and positioned to measure the weight and loading on the associated motor mount 109 as well as monitoring for vibration or feedback anomalies within the electric motor. Additionally, the load cell data may be utilized to measure the torsional loading of electric motor 107. In some cases, slight vibrations in stator 111 of electric motor 107 may cause undesirable interactions between the electric field induced by stator 111 and rotor 113, including, for example and without limitation "cogging" as understood in the art. By monitoring for such vibrations, damping characteristics of motor mount 109 may be varied to avoid such problems.

In some embodiments of the present disclosure, any motor mounts 109 used to couple between electric motor 107 and surface 10 may be adapted to not bear the weight of electric motor 107. In some embodiments, electric motor 107 may be supported by, for example, shaft 115, and a motor mount 109 may be adapted to prevent rotation and to provide dampening of reaction torque of electric motor 107 during operation. In some embodiments, electric motor 107 may be supported by, for example and without limitation, chains or steel cables.

Although described throughout as being part of drawworks 101, one having ordinary skill in the art with the benefit of this disclosure will understand that electric motor 107 coupled to surface 10 by motor mounts 119 as described herein may be utilized to power any other load or piece of equipment including, for example and without limitation, a mud pump, hoist, mining hoist, or any other application in which large load moment or moment changes are anticipated.

Furthermore, although previously described as including a single electric motor 107, one having ordinary skill in the art with the benefit of this disclosure will understand that two or more electric motors may be utilized with one or more motor mounts 119 as previously discussed and coupled to shaft 115.

Figure 8:
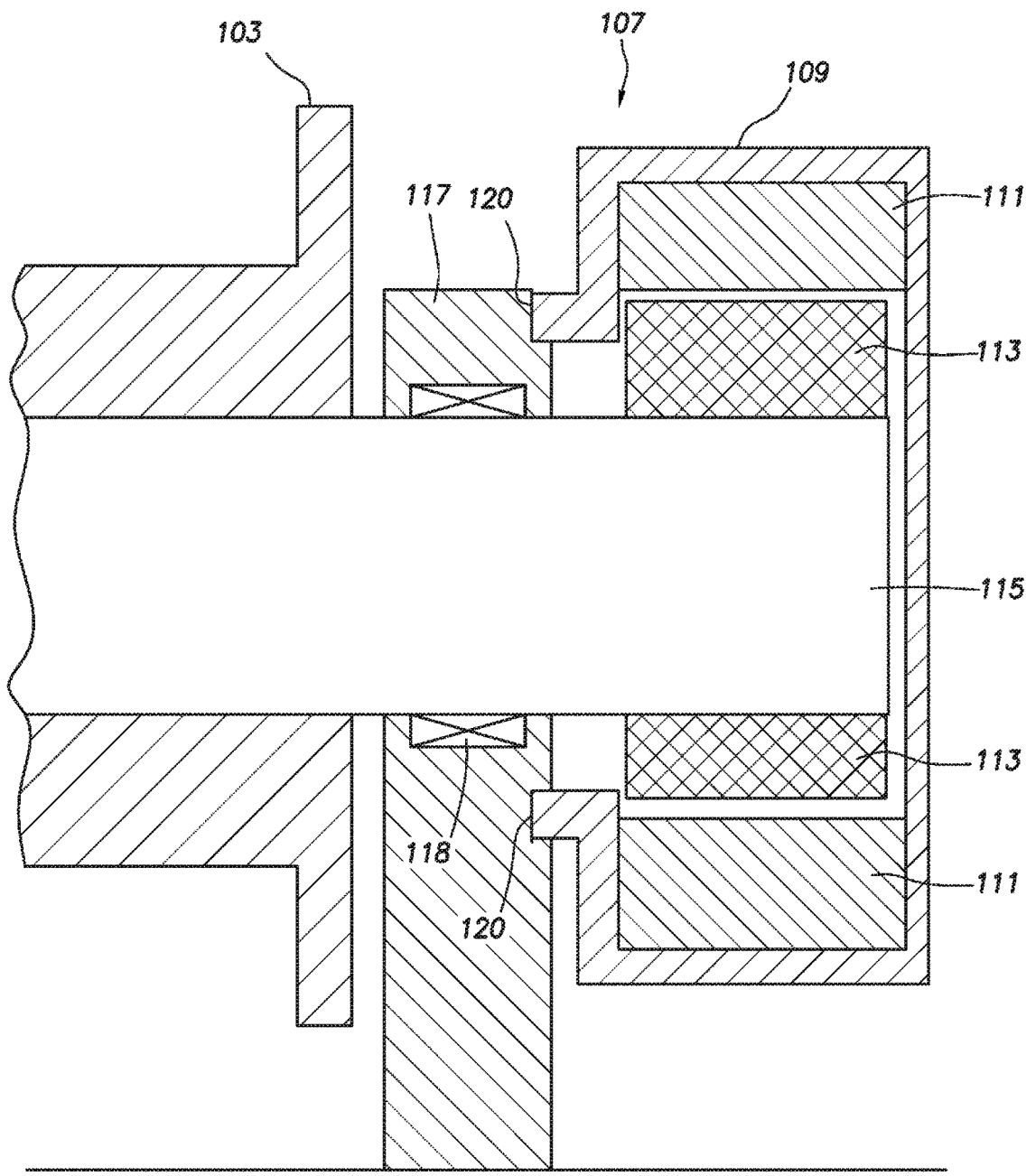
FIG. 8 depicts a partial cross section view of a drawworks consistent with embodiments of the present disclosure.

In some embodiments of the present disclosure, as depicted in FIG. 8, motor housing 109 and stator 111 of electric motor 107 may be supported by support 117. In some such embodiments, motor housing 109 may be coupled directly to an adjacent support 117. In some embodiments, support 117 may additionally provide the torsional reaction force to prevent rotation of motor housing 109 and stator 111 as shaft 115 is rotated. In some embodiments, any bearings between motor housing 109 or stator 111 and rotor 113 or shaft 115 may be excluded entirely. In some embodiments, support bearing 118 between shaft 115 and support 117 may thus support the weight of shaft 115 and drum 103. In some embodiments, support 117 may include locating groove 120 cut therein to allow a corresponding extension of motor housing 109 to couple to support 117. In some embodiments, motor housing 109 and stator 111 may be installed to support 117 and around shaft 115 as described herein above with respect to FIGS. 6 and 7. Although described herein as coupled to drum 103, one having ordinary skill in the art with the benefit of this disclosure will understand that electric motor 107 as described herein may be used with any other equipment powered by shaft 115. For example and without limitation, electric motor 107 may be used to power a top drive, drawworks, hoist, rotary table, or elevator.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A direct drive hoist, comprising:
an electric motor,
a first motor mount, the first motor mount adapted to couple the electric motor to a surface, the first motor mount including a damping assembly adapted to allow damped movement between the electric motor and the surface, the first motor mount including an adjusting assembly adapted to extend or retract the first motor mount;
a shaft extending through electric motor wherein there is no bearing between the electric motor and the shaft, the shaft adapted to be rotated by the electric motor; and
a load connected to the shaft, the load adapted to be rotated by the shaft as the shaft is rotated by the electric motor.

2. The direct drive hoist of claim 1, wherein the electric motor comprises:
a housing including a support point adapted to couple the electric motor to the first motor mount;
a stator coupled to the housing; and
a rotor coupled to the shaft.

3. The direct drive hoist of claim 2, wherein the shaft further comprises a load shaft and a motor shaft, the load shaft coupled to the drum, the motor shaft coupled to the rotor, the load shaft and the motor shaft coupled by a fixed coupler.

4. The direct drive hoist of claim 3, wherein the fixed coupling comprises a flange coupler.

5. The direct drive hoist of claim 2, wherein the shaft comprises an externally splined end portion and the rotor comprises a corresponding internal spline, the shaft adapted to be inserted into or removed from the rotor.

6. The direct drive hoist of claim 2, wherein the shaft and rotor are permanently coupled, the shaft and rotor adapted to be inserted into or removed from the stator of the electric motor.

7. The direct drive hoist of claim 6, wherein the rotor is formed as a part of the shaft.

8. The direct drive hoist of claim 2, wherein the support point is adapted to couple to the first motor mount by a pinned coupling.

9. The direct drive hoist of claim 2, further comprising:
a second motor mount, the second motor mount adapted to couple the electric motor to the surface, the second motor mount including a second damping assembly adapted to allow damped movement between the electric motor and the surface, the second motor mount including a second adjusting assembly adapted to extend or retract the first motor mount, and
wherein the housing includes a second support point, the second motor mount coupled between the second support point and the surface, the first and second support points positioned diametrically opposed with respect to the shaft.

10. The direct drive hoist of claim 1, wherein the damping assembly comprises a first damper element positioned between a surface mount coupled to the surface and a first bearing plate such that the damper element is compressed between the first bearing plate.

11. The direct drive hoist of claim 10, wherein the damping assembly further comprises a second damper element positioned between the surface mount and a second bearing plate, the second bearing plate positioned on a side opposite the surface mount from the first bearing plate, the second bearing plate coupled to the first bearing plate such that compressive force between the first and second bearing plates compresses the first and second damper elements.

12. The direct drive hoist of claim 11, wherein the first and second bearing plates are coupled by one or more threaded members, the threaded members adapted to allow adjustment of the compression of the damper elements.

13. The direct drive hoist of claim 12, wherein the first and second damper elements have material properties corresponding to a spring coefficient and a damping coefficient, the spring coefficient, damping coefficient, and electric motor defining a spring-mass-damper system having a harmonic frequency; and the spring coefficient and damping coefficient are selected such that the harmonic frequency of the spring-mass-damper system does not correspond to an anticipated rotation rate of the load.

14. The direct drive hoist of claim 13, wherein the harmonic frequency of the spring-mass-damper system is selected to be less than the anticipated rotation rate of the load.

15. The direct drive hoist of claim 14, wherein the harmonic frequency of the spring-mass-damper system is selected to be less than $\frac{1}{3}$ the anticipated rotation rate of the load.

16. The direct drive hoist of claim 13, wherein adjustment of the threaded members allows the harmonic frequency to be adjusted.

17. The direct drive hoist of claim 1, wherein the adjusting assembly comprises a screw jack assembly, the screw jack assembly including at least one threaded rod and a correspondingly threaded body nut, the threaded rod adapted to be extended or retracted from the threaded nut as the threaded nut is rotated.

18. The direct drive hoist of claim 17, wherein the screw jack assembly comprises a first threaded rod having a right-handed thread and a second threaded rod having a left-handed thread, and the body nut includes a first portion of internal threading having a right-handed thread engaged with the first threaded rod and a second portion of internal threading having a left-handed thread engaged with the second threaded rod, such that rotation of the body nut causes the first and second threaded rods to move towards or away from each other depending on the direction of rotation of the body nut.

19. The direct drive hoist of claim 1, further comprising a load cell coupled to the first motor mount adapted to measure one or more of loading, compression, vibration, or deflection of one or more of the first motor mount, the electric motor, or the shaft.

20. The direct drive hoist of claim 19, wherein the load cell is adapted to measure the torsional loading on the electric motor.

21. The direct drive hoist of claim 1, wherein the hoist comprises a drawworks.

22. The direct drive hoist of claim 1, wherein the motor is coupled to the surface by at least one of a cable or chain.

23. A method comprising:
  providing a direct drive hoist, the direct drive hoist including:
    an electric motor,
    a first motor mount, the first motor mount adapted to couple the electric motor to a surface, the first motor mount including a damping assembly adapted to allow damped movement between the electric motor and the surface, the first motor mount including an adjusting assembly adapted to extend or retract the first motor mount;
    a shaft extending through the electric motor wherein there is no bearing between the electric motor and the shaft, the shaft adapted to be rotated by the electric motor; and
    a load connected to the shaft, the load adapted to be rotated by the shaft as the shaft is rotated by the electric motor; and
  adjusting one or more of the damping assembly and the adjusting assembly in response to one or more of radial displacement of the shaft; misalignment between the electric motor and the shaft, load, or rotor; observed vibration; cogging; or bearing tolerances.

\* \* \* \* \*

UNITED STATES PATENT AND TRADEMARK OFFICE
CERTIFICATE OF CORRECTION

PATENT NO. : 10,150,659 B2
APPLICATION NO. : 14/815622
DATED : December 11, 2018
INVENTOR(S) : Kuttel et al.

It is certified that error appears in the above-identified patent and that said Letters Patent is hereby corrected as shown below:

On the Title Page

Delete the title page and substitute therefore with the attached title page consisting of the corrected illustrative figure(s).

In the Drawings

Please replace FIGS. 1-8 with FIGS. 1-8 as shown on the attached pages.

Signed and Sealed this
Thirtieth Day of April, 2019

Andrei Iancu
*Director of the United States Patent and Trademark Office*

CERTIFICATE OF CORRECTION (continued)

(12) United States Patent (10) Patent No.: US 10,150,659 B2
Kuttel et al. (45) Date of Patent: Dec. 11, 2018

(54) DIRECT DRIVE DRAWWORKS WITH BEARINGLESS MOTOR

(71) Applicant: CANRIG DRILLING TECHNOLOGY LTD., Houston, TX (US)

(72) Inventors: Beat Kuttel, Spring, TX (US); Kevin R. Williams, Cypress, TX (US); Brian Ellis, Houston, TX (US); Faisal Yousef, Houston, TX (US)

(73) Assignee: NABORS DRILLING TECHNOLOGIES USA, INC., Houston, TX (US)

(*) Notice: Subject to any disclaimer, the term of this patent is extended or adjusted under 35 U.S.C. 154(b) by 651 days.

(21) Appl. No.: 14/815,622

(22) Filed: Jul. 31, 2015

(65) Prior Publication Data

US 2016/0031686 A1 Feb. 4, 2016

Related U.S. Application Data

(60) Provisional application No. 62/099,258, filed on Jan. 2, 2015, provisional application No. 62/032,880, filed on Aug. 4, 2014.

(51) Int. Cl.
*B66D 1/82* (2006.01)
*B66D 1/12* (2006.01)
(Continued)

(52) U.S. Cl.
CPC .............. *B66D 1/82* (2013.01); *B66D 1/12* (2013.01); *B66D 1/14* (2013.01); *F16F 15/02* (2013.01);
(Continued)

(58) Field of Classification Search
CPC .... B66D 1/82; B66D 1/12; B66D 1/14; F16F 15/02; F16M 7/00; F16M 1/04; H02K 5/24; H02K 5/26; H02K 7/14
See application file for complete search history.

(56) References Cited

U.S. PATENT DOCUMENTS 1,922,184 A * 8/1933 White .............. H02K 5/24
248/593
2,709,284 A 5/1955 Evans et al.
(Continued)

FOREIGN PATENT DOCUMENTS

CN 200943027 Y 9/2007
CN 201074171 Y 6/2008
(Continued)

OTHER PUBLICATIONS

Office Action issued in U.S. Appl. No. 12/629,354 dated Dec. 19, 2011 (11 pages).
(Continued)

*Primary Examiner* — Michael E Gallion
(74) *Attorney, Agent, or Firm* — Adolph Locklar

(57) ABSTRACT

An electric motor for a direct drive drawworks may be supported by one or more motor mounts. The motor mounts may include adjusting assemblies adapted to increase or decrease the length of the motor mounts. The motor mounts may include damping assemblies adapted to allow damped motion between the electric motor and the surface. The length and damping coefficients of the motor mounts may be adjusted to align the electric motor with the drum or shaft to reduce vibration. The electric motor may be removable from the drawworks by, for example, a splined shaft, a flange coupled shaft, or the rotor being selectively removable from the interior of the motor.

23 Claims, 7 Drawing Sheets